US007212548B2

United States Patent
Bridges et al.

(10) Patent No.: US 7,212,548 B2
(45) Date of Patent: May 1, 2007

(54) MULTIPLE T1 CHANNEL INVERSE MULTIPLEXING METHOD AND APPARATUS

(75) Inventors: Jason David Bridges, Harvest, AL (US); Jason Robert Gastler, Ardmore, AL (US); Charles A. Wilson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 1051 days.

(21) Appl. No.: 10/177,284

(22) Filed: Jun. 21, 2002

(65) Prior Publication Data

US 2003/0235222 A1    Dec. 25, 2003

(51) Int. Cl.
H04L 12/28    (2006.01)
H04J 3/16     (2006.01)
H04J 3/04     (2006.01)

(52) U.S. Cl. .................... 370/473; 370/535; 370/395.3
(58) Field of Classification Search ................ 370/535, 370/536, 542, 394, 395.1, 395.3, 395.41, 370/441, 468, 470, 471, 472, 473, 474, 476
See application file for complete search history.

(56) References Cited

U.S. PATENT DOCUMENTS

| | | | |
|---|---|---|---|
| 6,205,142 B1* | 3/2001 | Vallee | 370/394 |
| 6,697,381 B1* | 2/2004 | Talbot et al. | 370/470 |
| 6,952,434 B1* | 10/2005 | Jagannatharao et al. | 370/536 |
| 7,142,564 B1* | 11/2006 | Parruck et al. | 370/474 |

OTHER PUBLICATIONS

PacketStar™ PSAX 1250 Acess Concentrator User Guide, Oct. 2000, Lucent Technologies, Issue 1, System Software Release 6.3.0, p. 45 of Chapter 3.*

* cited by examiner

*Primary Examiner*—Hanh Nguyen
(74) *Attorney, Agent, or Firm*—Allen, Dyer, Doppelt, Milbrath & Gilchrist, P.A.

(57) ABSTRACT

At a transmit site of an inverse multiplexing system, an input demultiplexer demultiplexes high bandwidth serial communication signals (e.g., fractional T3 rate signals) into communication signal packets for transmission over reduced bandwidth serial communication (e.g. T1) channels. A multiplexer for each channel combines successive packets of demultiplexed signals with bits of multibit packet reassembly control words that identify the channel and the order in which communication signal packets have been demultiplexed, to produce successive frames for transmission over the channel. At a receiver site the control words are extracted from the frames of data and analyzed to control reassembly of the serial data packets into their original order.

21 Claims, 6 Drawing Sheets

MULTIPLE T1 CHANNEL INVERSE MULTIPLEXING METHOD AND APPARATUS

FIELD OF THE INVENTION

The present invention relates in general to communication systems and subsystems therefor, and is particularly directed to a new and improved inverse multiplexing method and apparatus for transporting a large bandwidth data stream, for example, that supplied from a high density, high bandwidth data source such as a router, over a plurality of relatively smaller bandwidth channels, such as T1 channels, so as to provide incremental scalability of the data rate purchased and used by a customer, and thereby serve as an effective bridge between single lower data rate (e.g., T1) channel and a much higher data rate (e.g., T3) line.

BACKGROUND OF THE INVENTION

The ability to conduct high-speed data communications between remotely separated data processing systems and associated subsystems has become a requirement of a variety of industries and applications, such as business, educational, medical, financial and personal computer uses. Moreover, it can be expected that current and future applications of such communications will continue to engender more such systems and services. Currently available digital subscriber line (DSL) technology provides for the delivery of relatively high data bandwidth digital communication services, selected in accordance with type and length of data transport medium, schemes for encoding and decoding data, and transmission rate, which will vary depending upon customer requirements.

At the low end of the bandwidth usage scale, a T1 data rate will usually suffice, whereas high data transport density and bandwidth customers (such as in large scale industrial and financial institution applications) may require a much higher bandwidth, such as a T3 system. In a large number of applications, however, the customer's needs fall somewhere in between. Because of the very substantial increase in cost associated with upgrading to very high bandwidth (T3) service, service providers now offer a form of 'fractional' T3 service, in which the data transport capabilities of a plurality of T1 data lines are used, by employing an inverse multiplexing scheme known in the communications industry as Inverse Multiplexing for Asynchronous Transfer Mode (or ATM/IMA). Unfortunately, this particular ATM transport mechanism suffers from a relatively high overhead penalty (on the order of eleven, and most of its current implementations have relatively high royalties attached to them.

SUMMARY OF THE INVENTION

In accordance with the invention, drawbacks of conventional ATM/IMA-based digital communication systems are effectively obviated by a new and improved robbed bit-based T1 channel-combining mechanism and an associated synchronization engine, that take advantage of the characteristics of a T1 channel, to realize a multi T1 channel transport scheme that enjoys a very reduced overhead (on the order of one-half of one percent) and avoids royalty penalties of currently available schemes.

The inverse multiplexer of the invention includes a transmitter section and a receiver section. The transmitter section contains an input demultiplexer that segments a high bandwidth serial data stream, such as that supplied by an associated router, into respective multibit packets for serial transmission over respective (T1) communication channels by transmit multiplexers within identically configured transmitter units. Each multibit data packet contains 191 consecutive bits of the demultiplexed serial data stream, with an individual bit of a buffered M-bit packet assembly control word prepended to the beginning of the frame by the transmit multiplexer of its associated channel, so as to form a 192 bit T1 data frame. As will be described, this allows the T1 frame sync to act as a packet delineator, and eliminates the need to insert a relatively long control word in each T1 data stream. The packet assembly control word contains subsegments that are used to control recovery and reassembly of the original high bandwidth serial data stream at the receiver. The steering path through a respective channel's transmit multiplexer is controlled by the T1 frame sync signal, which is also used to the shift out the contents of a packet assembly control word buffer a bit at a time, for use as the first of 192 bits of a respective T1 frame.

The receiver section has a plurality of frame disassembly units coupled to the plurality of T1 channels from the network. A respective frame disassembly unit contains a T1 framer coupled to receive successive 192 bit T1 frames received over its associated T1 channel. The T1 framer outputs the 192 bits of the frame to a demultiplexer and extracts frame sync at the first bit of the frame (coincident with the packet assembly control word bit) for use as a steering control input to the demultiplexer. The demultiplexer steers the remaining bits of payload data of each T1 frame to a serial data buffer, and couples the control word bit to an M bit long packet assembly control word buffer.

The 191 bit long data segments stored in the data buffers of the frame disassembly units are coupled to a receiver decode logic module. The receiver decode logic module is coupled with a random access memory (RAM) into which received data segments for the respective T1 channels are stored, and which serves as a variable delay element. The receiver decode logic module contains decode software that controls the reading out of data segments that have been stored in memory, so as to reassemble the contents of the received data segments into successive bits of a high bandwidth output data stream that faithfully replicates the input data stream supplied to the input demultiplexer at the transmitter. The M-bit packet assembly control words stored in the control word buffers of the frame disassembly units are coupled to a receiver control logic module that contains software used to control the operation of the receiver decode logic and also the transceiver as a whole.

A respective packet assembly control word contains both the identification of its associated T1 channel, as well as a 'sequence number' that indicates where, within a numerical sequence of packet assembly control words for a particular channel, that packet assembly control word lies. The same sequence number is used by the transmit control logic at the transmitter during the channel scanning of the input demultiplexer, for defining the contents of respective packet assembly control words supplied to transmitter sections for all of the active channels, in order to facilitate reassembly of the demultiplexed 191 bit data segments at the receiver.

In the course of writing each multibit data segment into memory and subsequent address pointer adjustment for data recovery, the receiver decode logic module initially waits for the receiver control logic module to successfully locate a complete and valid control word in the control word buffer for each channel. For this purpose the receiver control logic examines a respective control word buffer for the presence of a valid code word or header portion, and then performs a validity check on the entire control word for that channel.

Once a valid control word has been identified in a respective channel's packet assembly control word buffer, the control word is stored for further processing. The receiver decode logic routine infers that the data packet associated with the Mth bit of the contents of the control buffer is the last or Mth data packet for that control word. It therefore knows that the address pointer for writing the contents of the 191 bit data buffer into the next available 191 bit storage entry in RAM will point to the last or Mth data segment address associated with the control word.

To reassemble the 191 bit data segments stored in RAM for the various channels in their proper order in the output data stream, the data packets are read out from memory in the order of their packet assembly control word sequence numbers and in the order of sequential scanning of the respective T1 channels carried out at the input demultiplexer at the transmitter. Since the channels are scanned sequentially at the transmitter, the stored 191 bit long data segments for the various channels may be readily interleaved with one another in the proper order at the receiver, by adjusting their associated memory address pointers to point to a respective channel's first data entry, whose control word sequence number is the same as that for the address pointer for every active channel.

For this purpose, the receiver decode logic routine stores each channel's valid control word in memory and maintains the address pointers for the last or Mth data packet or segment. It then builds a sequencer table that associates each channel with the control word sequence number of the stored valid control word, as detected by the receiver control logic module for that channel. The sequencer table includes a channel number, a sequence number ($SN_x$), an address pointer ($AD_x$) that points to the RAM memory location for the last or Mth bit 191 data packet, a sequence number difference (SND), and a sequence number offset ($SNO_x$).

All sequence numbers are subtracted from the sequence number for the first listed channel to determine the value of the sequence number difference (SND) for each channel. The respective values are stored for each channel. The largest SND value is subtracted from each SND value and stored as a respective sequence number offset $SNO_x$. This effectively identifies which channel has the largest transport delay, as all higher sequence numbers imply previous receipt and storage of M frames of data for every control word having a larger sequence number. The routine then adjusts the data entry address pointers by respective amounts that place each address pointer for each channel to that location in memory containing the same (first) data packet of the same and lowest sequence number in the table. As the address pointers are successively generated, the data packets are read out of memory and coupled through an output multiplexer or sequencer to produce the original reconstructed high bandwidth serial data stream.

In addition to initiating operation of the receiver decoder upon detection of a valid control word for a respective channel, the receiver control logic module conducts additional tests to determine whether the channel is of sufficient quality to continue to be used. Whenever a control word is detected, but is not confirmed as valid, the receiver control logic routine records an error for that channel and compares an accumulated number of such errors for that channel with a threshold. If the threshold is reached, a T1 channel failure is declared. A like action takes place at the transceiver at the far end of the channel, as both receiver sections carry out like operations on their received packets. As a result, an error prone T1 channel will be taken out of service and placed in a testing state by both receivers. In this state, rather than being used to transmit user data, the channel will instead attempt to transmit valid control codes. After a certain number of consecutive successful decodes, to indicate that the fault has been cleared, the channel will be restored so that data transmission may resume.

DETAILED DESCRIPTION

Figure 1:
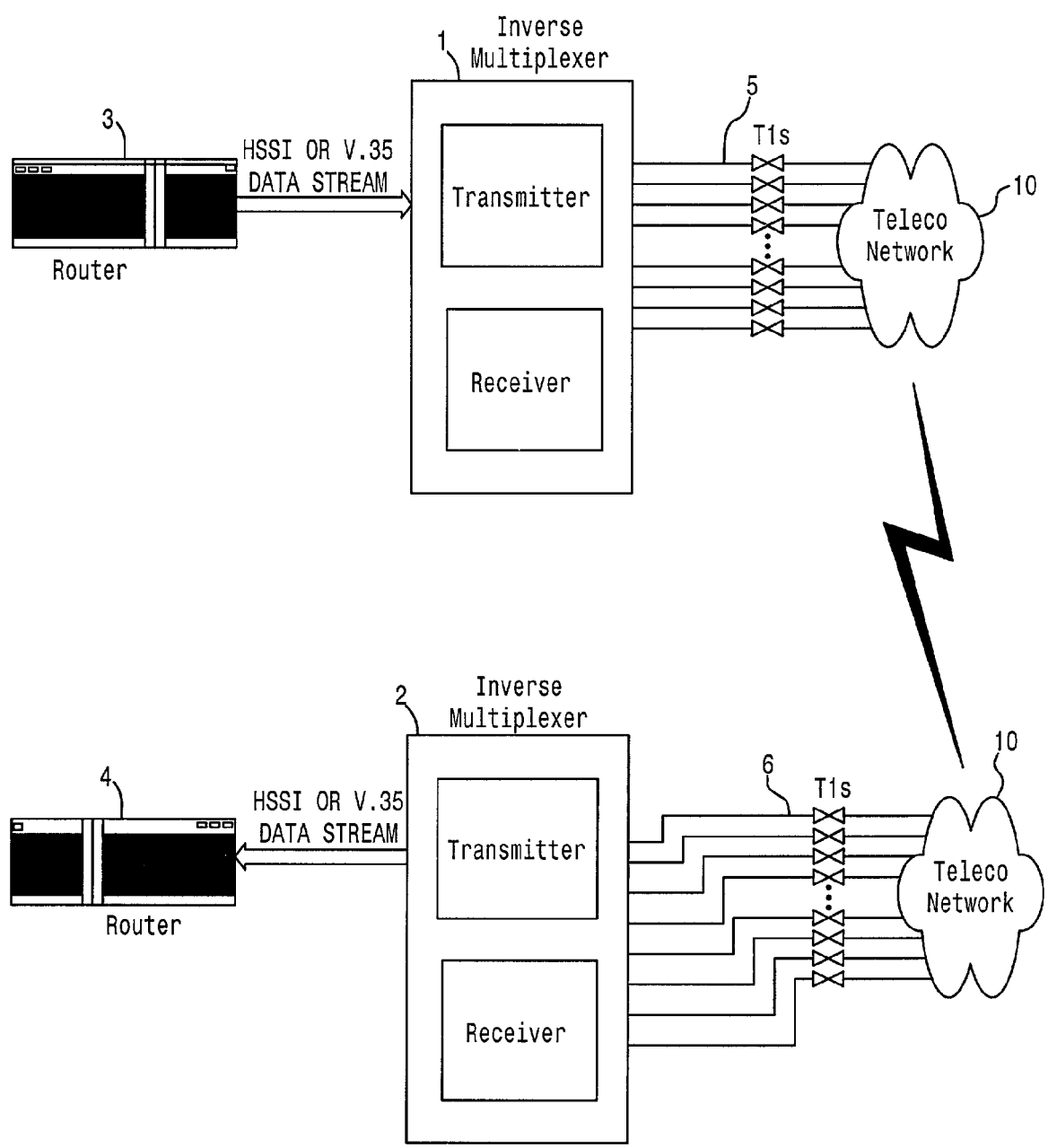
FIG. 1 is a reduced complexity diagram of the general architecture of a digital communication system employing the inverse multiplexer of the present invention.

Before detailing the multiple T1 channel-combining, inverse multiplexing digital data transport mechanism of the present invention, it should be observed that the invention resides primarily in a prescribed arrangement of conventional communication hardware components and attendant supervisory communications microprocessor circuitry and application software therefor, that controls the operations of such components. In a practical implementation that facilitates their incorporation into readily commercially available telecommunication transceiver equipment (such as that which may be installed at a central office or customer premises), the inventive arrangement may be readily implemented using a general purpose digital computer, or field programmable gate array (FPGA)-configured, application specific integrated circuit (ASIC) chip sets. In a practical hardware implementation of such chip sets, digital ASICs are preferred.

Consequently, the configuration of such subsystems and components and the manner in which they may be interfaced with a plurality of telecommunication links (e.g., T1 channels) have, for the most part, been shown in the drawings by readily understandable block diagrams and associated flow charts, which show only those specific details that are pertinent to the present invention, so as not to obscure the disclosure with details which will be readily apparent to those skilled in the art having the benefit of the description herein. Thus, the block diagrams and flow charts of the Figures are primarily intended to show the major components of the invention in convenient functional groupings, whereby the present invention may be more readily understood.

Attention is now directed to FIG. 1, which is a reduced complexity diagram of the general architecture of a digital communication system in which the present invention may be employed. The system contains a pair of mutually compatible inverse multiplexer-based, digital communication transceiver units 1 and 2, respectively installed at remotely separated sites of the system. As a non-limiting example, each transceiver unit may be configured to be installable in a integrated access device platform, such as, but not limited to a Model 550 ATLAS Multi-T1 Integrated Access Device, manufactured by Adtran Incorporated, Huntsville, Ala. Each inverse multiplexer includes a transmitter section and a receiver section, to be described below with reference to FIGS. 2–6. On their customer interface sides, the transceiver units are coupled to associated data source and distribution equipments, shown as respective routers 3 and 4. On their network interface sides, the transceivers are coupled via sets of plural T1 channels 5 and 6 to a telecommunication network 10.

Figure 2:
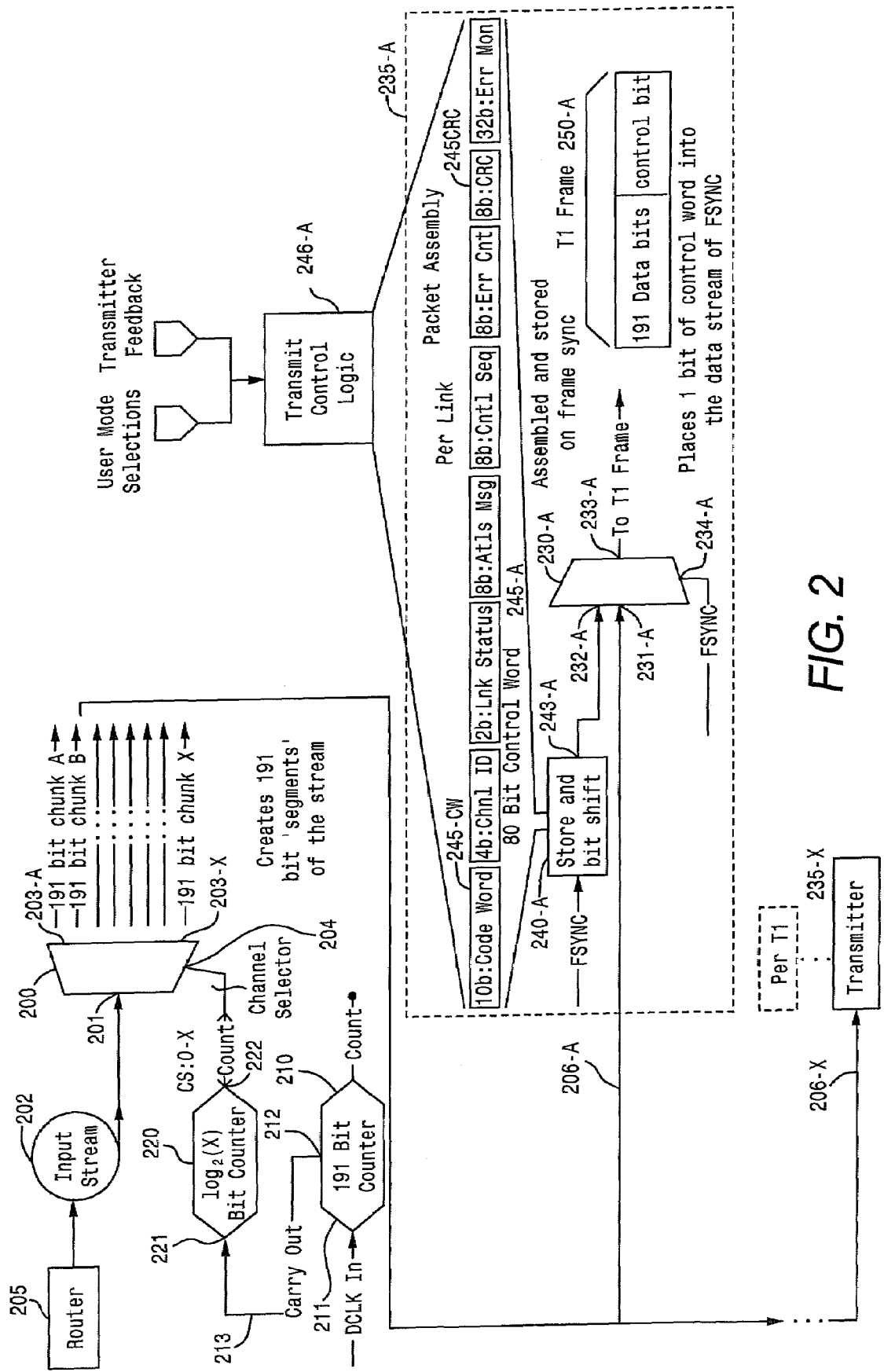
FIG. 2 shows the transmitter section of the inverse multiplexer transceiver unit of the invention.

Referring now to FIG. 2, the transmitter section of an inverse multiplexer transceiver unit is shown as comprising an input demultiplexer (demux) 200, having a serial input port 201 to which a high bandwidth serial data stream 202 (such as that supplied by an associated fractional T3 rate router 205, as a non-limiting example) is supplied. Input demux 200 has a plurality of output ports 203-A . . . 203-X, from which respective demultiplexed multibit packets or segments of the high bandwidth serial data stream 202 are serialized out over respectively associated serial communication links 206-A . . . 206-X to respective transmit multiplexers (muxes) 230 within respective ones of identically configured transmitter units 235-A . . . 235-X. In a non-limiting but preferred embodiment, using extended super-frame (ESF) protocol, each data packet contains 191 consecutive bits of the demultiplexed serial data stream, to which an additional packet assembly control word bit, to be described, is prepended as a first bit in the transmitter unit, to realize 192 bits of data per transmitted T1 data frame.

In order to segment the high bandwidth serial data stream 202 into the desired size of 191 data bits per data packet, the input data stream's associated data clock signal (DCLK_in) is supplied to the input port 211 of a 191 bit counter 210. Counter 210 has its carry out port 212 coupled over line 213 to the count input port 221 of a $\log_2$ (X) counter 220, the count output 222 of which is coupled to the select port 204 of the input demux 200. As counter 210 sequentially counts segments of 191 data clock signals, its carry output signal on line 213 increments the contents of counter 220 which, in turn, changes the select code applied to the select input 204 of input demux 200. This operation serves to sequentially and repetitively step through or 'scan' the output ports 203-A, . . . , 203-X of the input demux 200, and thereby provides successive 191 bit long segments of the high bandwidth serial data stream over serial communication links 206-A . . . 206-X to transmit muxes 230 within respective ones of transmitter units 235-A . . . 235-X.

Using transmitter unit 235-A, which is shown in detail in FIG. 2, as a non-limiting example, a respective 191 bit segment from the input demultiplexer 200 is coupled to a first serial input port 231-A of the transmitter unit's transmit mux 230-A. Transmit mux 230-A has a second input port 232-A coupled to the serial output port 243-A of an M-bit buffer 240-A, which stores respective bits of an M-bit packet assembly control word 245-A that is supplied from a transmit control word logic circuit 246-A.

As a non-limiting example, a respective M-bit packet assembly control word 245-A may be 80 bits in length, containing a plurality of (user programmable) subsegments used to control recovery and reassembly of the original high bandwidth serial data stream at the receiver. In the present example, the respective components of the 80 bit packet assembly control word supplied by the transmit control logic 246 to the shift register 240 are defined as follows:

Code Word (10 bits): identifies the start of the control word 245-A.

Channel ID (4 bits): specifies one of up to 16 T1 channels.
Link Status (2 bits): indicates condition of channel (00=ready but not data), (01=active), (10=errored/down), (11=dead/test)

Equipment Message (8 bits): mapped to processor accessible register.

Sequence Number (8 bits): identifies the sequential location or order of the packet assembly control word.

Error Count (8 bits): returns an error count to the transmitter.

CRC (8 bits): calculated over the entire control word.
Performance Monitor Sample Space (32 bits): used to calculate an approximate bit error percentage.

The steering path through a respective transmit mux (here, the transmit mux 230-A) is controlled by a T1 frame synchronization signal (FSYNC) applied to its select port 234-A (and also to the shift input of the shift register 240-A). In particular, as long as the FSYNC signal has a first logic state (e.g., a logical low), transmit mux 230-A will couple the successive bits of the serial data stream at its input port 231-A, as supplied over the link 206-A from the input demuliplexer 200, to its output port 233-A. For a change in state of the FSYNC signal (e.g., asserted to logical high, after 191 bits of data serially have been applied to the serial input port 231-A), however, the transmit mux 230-A will couple to its output port 233-A a single control word bit, as shifted out of shift register 240-A (by that same FSYNC signal) for use as a first bit of a respective (192 bits long) T1 frame 250-A.

As a result of this operation, the transmit mux 230-A outputs successive 192 bit long frames of serial data, each of which contains 191 bits of the original serial data stream as supplied thereto by the input demultiplexer 200, plus individually prepended control bits of the packet assembly control word 245-A. The use of only a single bit out of the available 192 bits per frame to prepend a respective control bit of a packet assembly control word translates to a very reduced overhead per frame (1 bit/192 bits=0.52%, or on the order of one-half of one percent, as described above). In the west-to-east transport direction of the system diagram of FIG. 1, as a non-limiting example, an individual 192 bit long T1 frame 250-A is thus serialized out by an associated framer over a respective T1 channel T1-A of the set of T1 channels 5 to the network 10 for delivery therefrom over an associated one of the set of T1 channels 6 to the recipient site transceiver 2.

Figure 3:
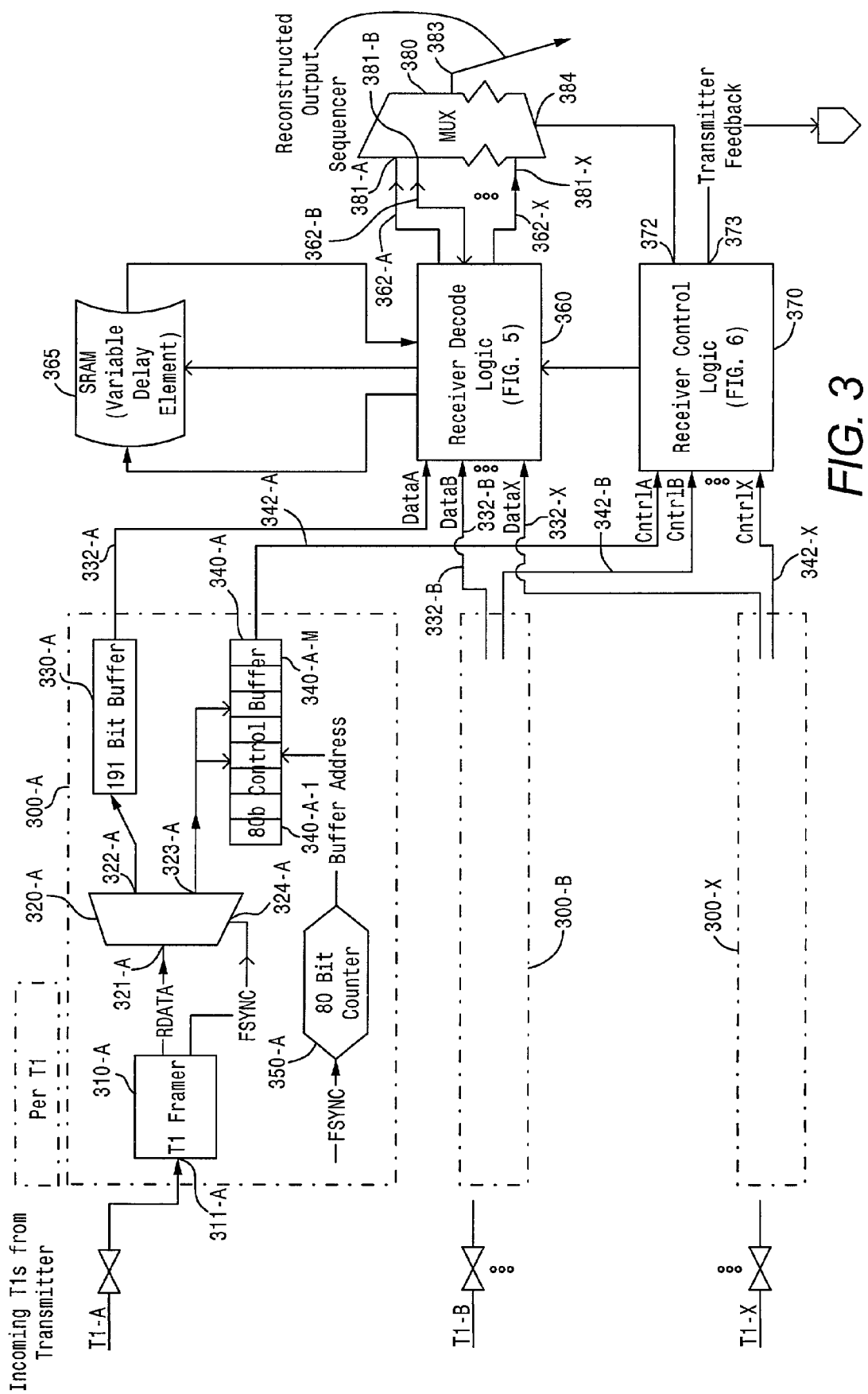
FIG. 3 shows the receiver section of the inverse multiplexer of the invention.

Referring now to FIG. 3, the receiver section is shown as comprising a plurality of frame disassembly units 300-A, 300-B . . . , 300-X, that are respectively coupled to respective ones of the plurality of T1 channels from the network, over which the T1 frames as produced by the respective transmitter sections 235-A . . . 235-X of FIG. 2 are transmitted. Using receiver unit 300-A as a non-limiting example, a T1 framer 310-A has its serial input port 311-A coupled to receive a respective 192 bit T1 frame supplied from an associated T1 channel T1-A. The T1 framer 310-A is operative to recover and serialize out the received (192) bits of each frame as a received data stream RDATA for application to a serial input port 321-A of a demux 320-A. T1 framer 310-A also outputs a frame sync signal FSYNC to the select port 324-A of the demux 320-A at the time of the first bit of the frame.

Demux 320-A has a first (serial payload data RDATA) output port 322-A coupled to a (191 bit long) serial data buffer or FIFO 330-A, and a second control word output port 323-A coupled to an M bit long (e.g., 80 bits in the present example) packet assembly control word buffer 340-A. As long as the FSYNC signal output by the framer 310-A has a first logic state (e.g., logical low), the demux 320-A will couple the successive bits of the received data stream RDATA at its input port 321-A to output port 322-A for serialized storage into 191 bit capacity data buffer 330-A. Since, in the present example of ESF framing, the frame sync signal FSYNC occurs every 192 bits, the demux 320-A will couple the first (control word) bit to the packet assembly control word buffer 340-A, and output 191 consecutive data bits of the RDATA stream into data buffer 330-A. Thus, the T1 frame sync signal serves as a packet delineator, and obviates having to insert a relatively long packet assembly control word in each T1 data stream.

The 191 bit long data segments (DataA . . . DataX) stored in the data buffers 330-A . . . 330-X are coupled over respective data lines 332-A . . . 332-X to a receiver decode logic module 360. As will be described, the receiver decode logic module 360 is associated with a random access memory (RAM) 365, into which received data segments for the respective T1 channels A-X are stored, and which serves as a variable delay element that allows the respective data streams received over the various T1 channels to be properly time-aligned for reassembly. To this end, the receiver decode logic module 360 contains decode software (to be described below with reference to FIG. 5) that is operative to control the reading out of data segments that have been stored in this set of RAM, so as to reassemble the contents of the received data segments into successive bits of a high speed output data stream that faithfully replicates the input data stream 202 originally supplied to the input demultiplexer 200 at the transmit site.

The receiver decode logic module 360 has respective outputs 362-A . . . 362-X coupled to input ports 381-A . . . 381-X of an output mux 380, from an output port 383 of which the reconstructed high bandwidth serial data stream is produced for application to an associated device, such as a router. The output mux 380 has its select port 384 coupled to an output 372 of the receive control logic module 370. The receive control logic module 370 has a second output 373 coupled as a transmitter feedback input for use by associated transmit control logic units used in the return communication direction.

In response to a change in state of the FSYNC signal (e.g., asserted to a logical high by the T1 framer 310-A upon the occurrence of the first bit time), demux 320-A will output or 'rob' the next received (first) bit (which is a control bit of a respective 192 bit long T1 frame) for storage into that one of the M stages 340-A-1, . . . 340-A-M of the packet assembly control word buffer 340-A, as pointed to by a buffer address value defined by the contents of an M-bit counter 350-A. The contents of counter 350-A are changed (e.g., incremented) at each FSYNC pulse, so that, as successive frames are received by the T1 framer 310-A, FSYNC pulses produced thereby will successively modify (e.g., increment) the contents of the 80-bit counter 350-A, and thereby change the buffer address to the packet assembly control word buffer 340-A to store a respective bit of the packet assembly control word as it is received.

The respective packet assembly control words (CntrlA . . . CntrlX) stored in the control word buffers 340-A . . . 340-X are coupled over respective control lines 342-A . . . 342-X to a receiver control logic module 370 (shown in FIG. 6). As will be described, the receiver control logic module 370 comprises control software that is operative to control the operation of the receiver decode logic 360 and also the transceiver as a whole.

As pointed out above with reference to FIG. 2, a respective T1 channel employs M-bit (e.g., 80 bits in the present example) packet assembly control words, each of which has a plurality of (user programmable) subsegments, that are employed to control recovery and reassembly of the original high speed serial data stream at the receiver. The respective bits of these control words are transmitted by prepending individual bits thereof to successive (191 bit) segments of the serial data stream being transported over a respective T1 channel. This is diagrammatically illustrated in FIG. 4, which shows successive frames of data for an arbitrary pair of T1 channels T1-$i$ and T1-$k$ of channels T1-A . . . T1-X.

Figure 4:
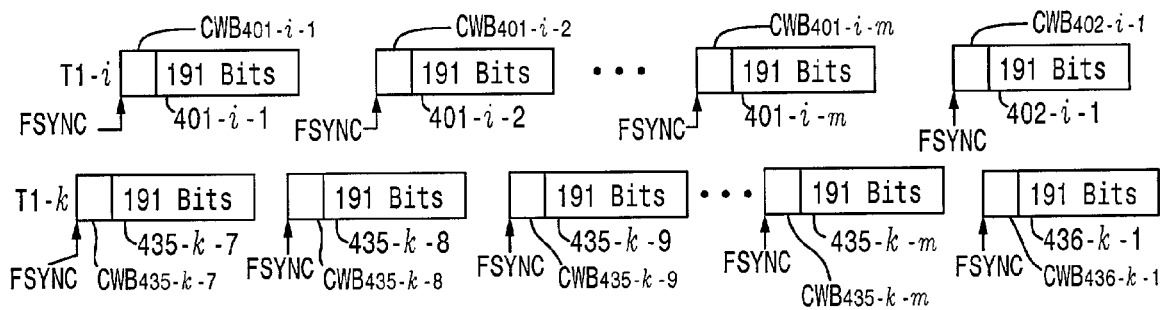
FIG. 4 shows a non-limiting example of successive frames of data and prepended control word bits transmitted over a pair of T1 channels.

In particular, for channel i, FIG. 4 shows a 192 bit frame 401-$i$-1 that contains 191 data bits, that is preceded by the first control word bit $CWB_{401-i-1}$ of a control word 245-$i$-1. This first frame is followed by second 192 bit frame 401-$i$-2, a first bit of which is the second bit $CWB_{401-i-2}$ of the same control word 245-$i$-1, followed by the next sequence of 191 data bits for that channel, and so on through the last or Mth, 192 bit long frame 401-$i$-M, which contains 191 data bits, to which is prepended the last control word bit $CWB_{401-i-M}$ of the control word 245-$i$-1. The next frame 402-$i$-1 for channel i contains the next 191 data bits, to which a control word bit is prepended. In this case, since the first bit of the previous frame 401-$i$-M was the last or Mth bit of the control word 245-$i$-1, all of the bits of that previous control word will have been transmitted, so that the next frame (402-$i$-1) will be associated with a new M-bit long control word 245-$i$-2, and will therefore contain the first bit of the next control word, namely bit $CWB_{402-i-M}$ of control word 245-$i$-2, and so on.

Similarly, for the other channel k, FIG. 4 shows a 192 bit frame 435-$k$-7 that contains a prepended seventh control word bit $CWB_{435-k-7}$ of a control word 245-$k$-35, followed by 191 data bits. The use of different control word sequence numbers (245-$i$-"1" vs. 245-$k$-"35") for the respective channels i and k in the example of FIG. 4 is for the purpose of illustrating a non-limiting example of an arbitrary time delay or transport offset between the two T1 channels i and k. In the example of FIG. 4, the control words 245-$i$-"1" and 245-$i$-"2" for channel i are respectively designated with sequence numbers "1" and "2", while for channel k, the sequence numbers of the respective control words 245-$k$-"35" and 245-$k$-"36" are "35" and "36", which implies that channel i has a greater delay than channel k.

As described above, a respective control word contains both the identification of its associated T1 channel, as well as a 'sequence number' that indicates where, within a numerical sequence of packet assembly control words for that channel, that particular packet assembly control word lies. The same sequence number is used by the transmit control logic 246-A for assembling the respective packet assembly control words supplied to the transmitter sections for all of the active channels during the channel scanning of the input demultiplexer 200, in order to facilitate reassembly of the demultiplexed 191 bit data segments at the receiver. As will be described, the packet assembly control word sequence numbers are used to adjust read address pointers to memory in the receiver from which (191 bit long) data segments will be read out in the order of the scanning of the respective channels at the transmitter.

Referring again to the example of FIG. 4, for channel k, the 192 bits of frame 435-$k$-7 are followed by the frame 435-$k$-8, which contains the next successive 191 bits of data for channel k, plus a prepended next or 8th bit $CWB_{435\text{-}k\text{-}8}$ of the control word 245-$k$-35, and so on through the last or Mth, 192 bit long frame 435-$k$-M, containing 191 data bits and a prepended last control word bit $CWB_{435\text{-}k}$-M of the control word 245-$i$-35. The next frame 436-$k$-1 contains the next 191 data bits for channel k, and a prepended first control word bit $CWB_{436\text{-}k\text{-}1}$ of the next control word 245-$k$-36, and so on, as described above.

Figure 5:
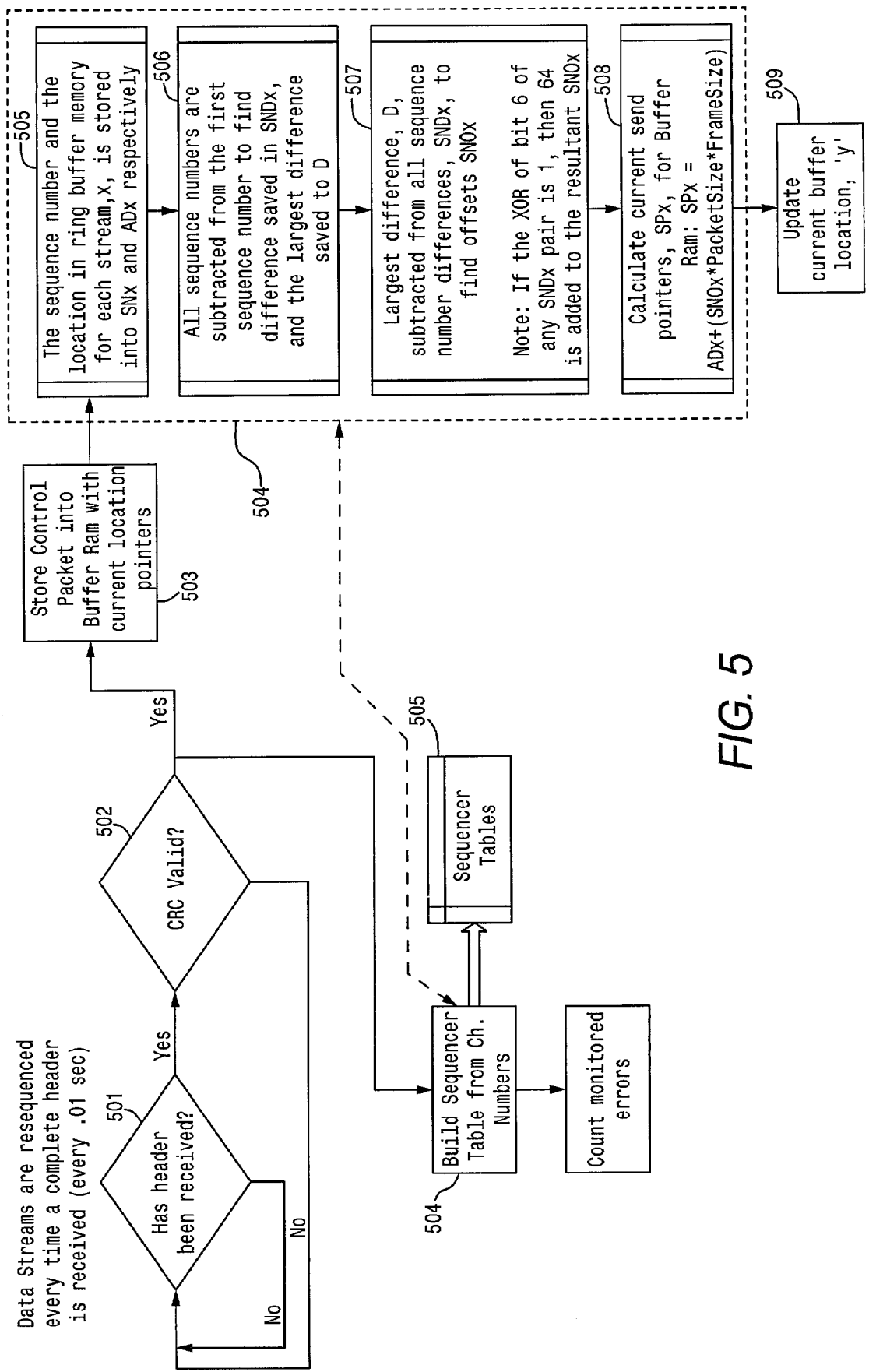
FIG. 5 is a flow chart associated with the operation of the receiver decode logic module of the receiver section of the inverse multiplexer shown in FIG. 3.
Figure 6:
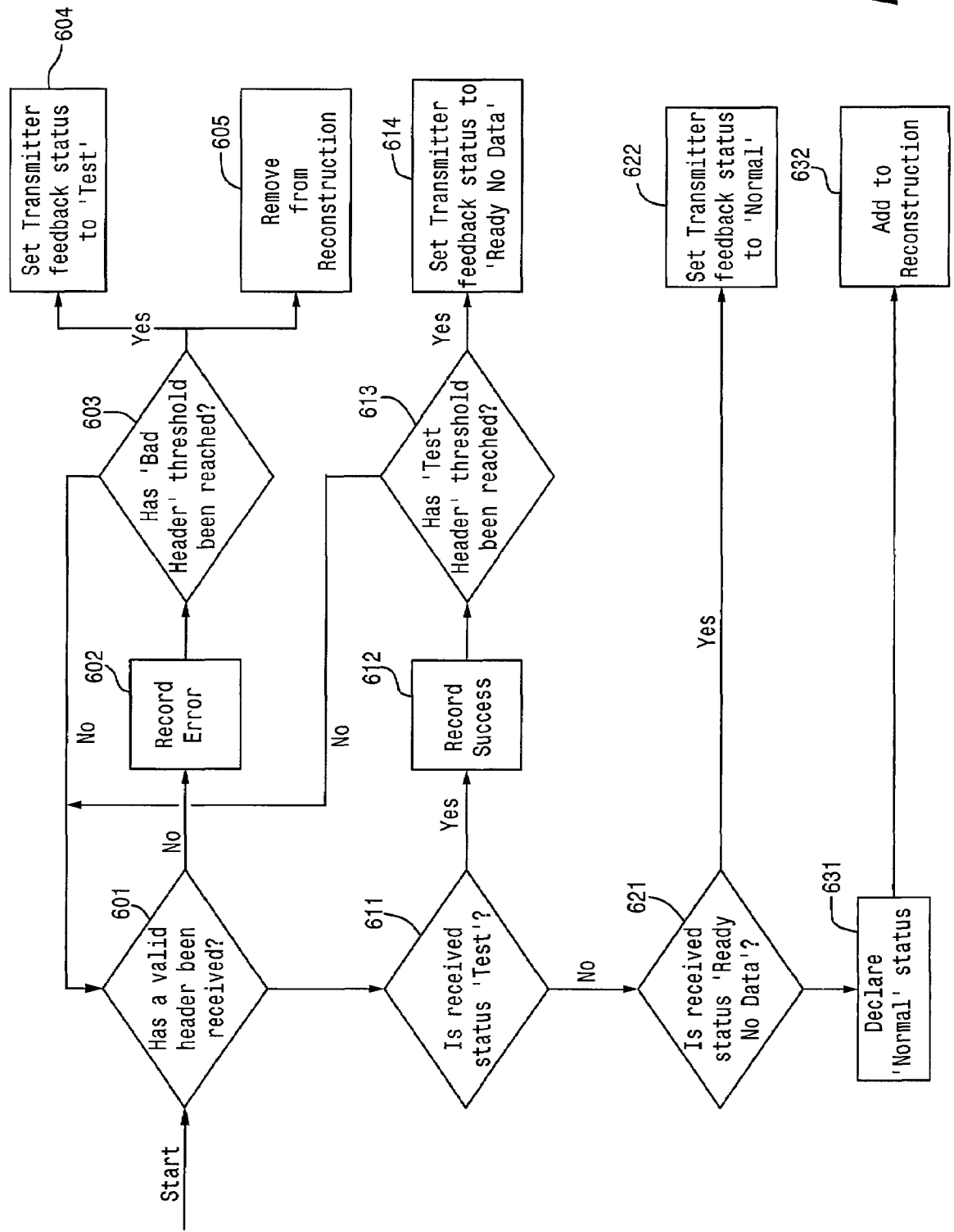
FIG. 6 is a flow chart associated with the operation of the receiver control logic module of the receiver section of the inverse multiplexer shown in FIG. 3.

The manner in which successive frames of data for each active channel, such as the two channels i and k shown in FIG. 4, are stored in memory at the receiver, and then read out and reassembled into contiguous sequential segments to recreate the original data stream applied to the serial input port of the input demultiplexer at the transmitter, is shown in the receiver decode logic flow chart of FIG. 5. As described above, each T1 channel has the contents of its packet assembly control word buffer 340 coupled to receiver control logic module 370 (a flow chart for which is shown in FIG. 6).

As a precursor to writing each 191 bit segment of data into memory and subsequent address pointer adjustment for data recovery, the receiver decode logic module 360 relies upon the receiver control logic module 370 successfully locating a complete and valid control word in the control word buffer for each channel, by examining prescribed stages of the respective packet assembly control word buffers 340-A . . . 340-X, in particular, the first ten stages thereof for the presence of a valid (ten bit) code word or header, shown at 245-CW in the control word diagram of FIG. 2, and performing a validity check on the entire control word.

More particularly, in response to the contents of the first ten stages of the packet assembly control word buffer 340 corresponding to a valid code word or header (the answer to query step 501 is YES), the routine transitions to query step 502 and performs a CRC on the entire packet assembly control word, to determine if the contents of the packet assembly control word buffer 340 are valid. Once the generated CRC matches that contained in the CRC field 245CRC of the control word (the answer to step 502 is YES), the receiver control logic module 370 signals the receiver decode logic module 360 that it may proceed.

Figure 7:
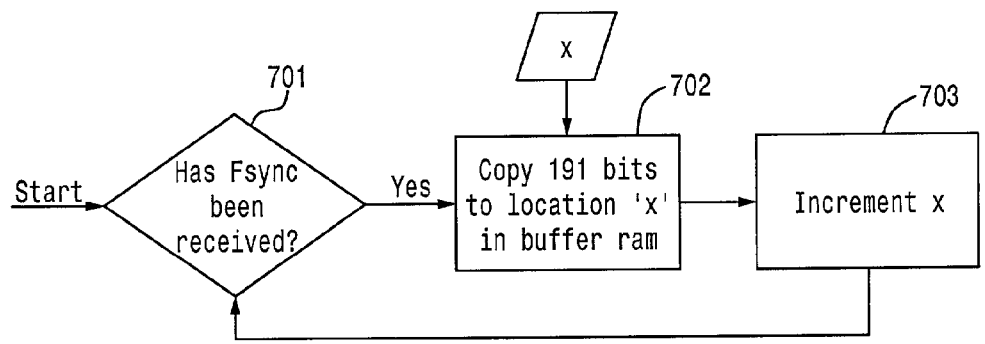
FIG. 7 is a flow chart associated with writing received data loaded in the bit data buffer into RAM.

To this end, in response to the answer to query step 502 being YES and indicating that the buffer 340 contains a complete and valid control word, the receiver decode logic routine stores the control word for further processing in a sequencer table, to be described. Also, as shown at steps 701–703 in the flow chart of FIG. 7, it also maintains the address pointers for writing the contents of the 191 bit data buffer 330 into the next available 191 bit storage entry x in RAM, so that it will point to the last or Mth data segment address associated with the packet assembly control word currently stored in buffer 340.

As noted earlier, in order to reassemble the 191 bit data segments stored for the various channels in their proper order in the output data stream, the data packets are read out from memory in the order of their control word sequence numbers and in the order of scanning of the respective T1 channels (sequentially from A to X) at the input demultiplexer 200 at the transmitter. Since the channels are scanned sequentially, the M packets per channel, per control word, may be readily interleaved with one another in the proper order at the receiver, by adjusting memory address pointers for the various channels, so that each pointer points to a respective channel's first data entry whose sequence number is the same as that for the address pointer for all active channels.

In order to do this, in step 504, the receiver decode logic routine builds a sequencer table 505 (a reduced complexity portion of a non-limiting example of which is shown below), that associates each T1 channel with the packet assembly control word sequence number of the valid packet assembly control word for that channel. The sequencer table example is shown below as having a T1 channel number (CH NO.) column, a sequence number ($SN_x$) column, an address pointer ($AD_x$) column, a sequence number difference (SND) column, and a sequence number offset ($SNO_x$) column.

| | SEQUENCER TABLE | | | |
|---|---|---|---|---|
| CH NO. | $SN_x$ | $AD_x$ | SND | $SNO_x$ |
| A | 50 | 368 | 0 | −15 |
| B | 35 | 573 | 15 | 0 |
| C | 45 | 102 | 5 | −10 |
| . | | | | |
| . | | | | |
| . | | | | |
| X | 60 | 104 | −10 | −25 |

More particularly, at step 505, for each channel, the sequence number ($SN_x$) and the address pointer ($AD_x$) to the RAM memory location for the last or Mth 191 data packet x having that sequence number are stored in the table. Next, in step 506, all sequence numbers are subtracted from the sequence number for the first listed channel to determine a difference value (SND) for each channel. The respective values are stored for each channel. Next, in step 507, the largest difference value (15 in the present example) is subtracted from each sequence number difference value SND and is stored as a respective sequence number offset $SNO_x$.

The purpose of this step is to identify which channel has the largest transport delay. This will necessarily be whichever channel has the lowest valued sequence number, since all higher sequence numbers imply previous receipt and storage of M frames of data for every packet assembly control word having a larger sequence number. In the tabulated example, channel B has the largest sequence number difference (+15), and this value is subtracted from those of each of the other channels to produce sequence number offsets $SNO_x$ therefor.

Once the sequence number offsets have been tabulated, the routine is able to adjust the address pointers by respective amounts that place each address pointer for each channel to that location in the serial data packet memory containing the same (first) serial data packet of the same and lowest sequence number in the table.

To this end, in step 508, for each channels, the routine calculates memory read or 'send' pointers $SP_x$ for the data RAM in accordance with the expression:

$$SP_x = AD_x + (SNO_x * \text{PacketSize} * \text{Frame Size})$$

Figure 8:
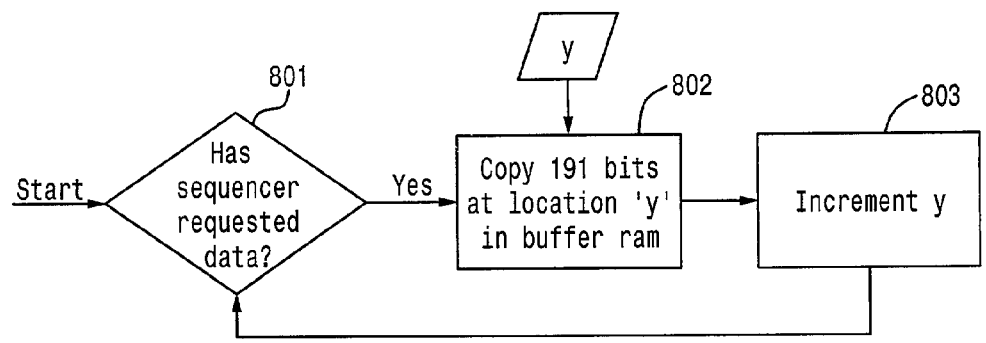
FIG. 8 is a flow chart associated with reading data stored in RAM out through the sequencer multiplexer.

Next, in step 509, as these address pointers are successively generated, the contents of memory 365 pointed thereto by the values y are read out in the manner shown in steps 801–803 of the flow chart of FIG. 8, and coupled through output mux (sequencer) 380 to realize the reconstructed high speed serial data over output link 385.

As pointed out briefly above, associated with and controlling the operation of the receiver decode logic module 360 is the receiver control logic module 370, a flow chart for which is shown in FIG. 6. The first step 601 corresponds to steps 501 and 502 of the flow chart of FIG. 5, described above, and is carried out to locate a valid control word, and the receiver decode logic does not proceed until it receives an indication (the answer to step 601 is YES) that a valid control word has been confirmed. The receiver control logic conducts additional tests to determine whether channel quality is sufficient for continued use.

In particular, whenever the control word is not valid (the answer to query step 601 is NO), the receiver control logic routine records an error (by incrementing an error counter that keeps track of detected 'bad' header errors) in step 602, and then transitions to error threshold query step 603. For example, if a T1 channel goes dead, all '1's will be received over the channel at both the host and remote transceiver. In step 603, a determination is made as to whether a prescribed number of 'bad' headers has been detected. To this end, if the answer to query step 603 is NO, the routine transitions back to query step 601. Query step 603 is used to declare a T1 channel failure, if a control packet cannot be successfully decoded after some number of number of packets.

Where the answer to query step 603 is YES ('bad' header threshold reached), the transmitter feedback status on output port 246 is set to 'Test' status in step 604, and the T1 channel is removed from service in step 605. A complementary action will take place at the transceiver at the far end of the channel, as both receiver sections carry out like operations on their received packets. As a result, the T1 channel will be taken out of service and placed in a testing state by both receivers. In this state, rather than being used to transmit user data, the channel will instead attempt to transmit valid control codes. After a certain number of consecutive successful decodes, the channel will be automatically restored.

When the answer to query step 601 is YES (indicating a valid header), the routine transitions to step 611, to determine whether the link status bits of the control packet are representative of 'Test' status (11). If so, a 'Test Header' counter will be incremented in step 612, and the contents of the 'Test Header' counter are then compared to a 'Test Header' threshold in query step 613. Similar to the 'bad' header counter employed in step 602, the 'Test Header' counter of query step 612 is used to keep track of detected 'Test' status code words.

In query step 613, a determination is made as to whether a prescribed number of 'Test Headers' has been detected. If not, the routine transitions back to query step 601. However, once the answer to query step 613 is YES, the routine transitions to step 614, wherein the transmitter feedback status on output port 246 is upgraded to 'Ready No Data', to indicate that the fault has been cleared, so that data transmission may resume.

If the answer to query step 611 is NO (indicating that the header is valid and the channel is not in Test status), the routine transitions to query step 621, wherein the link status bits of the control word are examined to determine whether the channel is in 'Ready No Data' status (00). If the answer to query step 621 is YES, the routine transitions to step 622, which upgrades the transmitter feedback status on output port 246 as 'Normal'. If the answer to query step 621 is NO, however, the routine transitions to step 631, which declares the channel as having a 'Normal Data' status. The channel is then added to reconstruction (made an inverse multiplexing participant) in step 632.

From the foregoing, it will be readily appreciated that the receiver control logic routine of FIG. 6 is operative to handle a number of T1 channel failure modes. For example, as pointed out above, if a T1 channel fails, all '1's will be received over than channel at both the host and remote transceiver. In this case, both sites' transceivers will detect an excessive number of bad control words, and the channel will be removed from insertion-sequencing with the other channels. The receiver control logic module will also notify its local transceiver's transmitter to change the T1 channel from active status to 'test' status in step 605.

Once in test status mode, each transmitter will transmit test packets, and the receive control logic of each site will continue to try to decode the control words. If the channel comes back up, and the requisite number of test control packets are decoded, then the transmitters will be switched to 'Ready (but) No Data' status, in step 614. Upon receipt of 'ready but no data packets', the receive control logic module will signal the transmitters of both sites to reestablish the 'ready' channel as active. Arbitration will then take place, to reestablish use of the channel.

Similarly, if half the T1 channel suffers a failure, one of the receiver's (for example that at the remote site) will begin receiving 'garbage', and will quickly exceed the threshold for bad control packet decodes. The channel will then be removed from the reconstruction rotation, and transmit logic on the remote will be notified to stop using the channel and start sending test packets, as described above. The host device will decode the incoming packets as test packets, remove the channel from active data rotation, and start sending 'Ready No Data' packets. The system will remain in this state until the other half of the T1 channel comes back up, since the host will not be able to receive 'Ready No Data' packets back from the remote transmitter. Once the channel is restored, arbitration will proceed as in the dead link case, and the channel will be reestablished.

The routine of FIG. 6 also handles the case where, rather than failing or going dead, the T1 channel becomes exceedingly noisy, and thereby effectively 'pollutes' the entire bandwidth due to the inverse multiplexing of the data streams. The threshold for this excessive noise condition is determined by the number of bad control packets that can be received before the channel is brought down in step 606 and the number of good control packets needed to bring the channel back up in step 614.

As will be appreciated from the foregoing description, by embedding a single packet assembly control word bit in each frame, and using the T1 frame sync signal to both extract the control bit and as a packet delineator, the robbed bit-based T1 channel-combining mechanism of the invention eliminates having to insert a relatively long control word in each T1 data stream, and thus exhibits a significantly reduced overhead relative to that of conventional ATM/IMA-based digital communication systems.

The incorporation of channel identification in each control word serves to automatically connect each T1 channel on the host side with a T1 channel on the receive side, regardless of any physical connection interchanges. This allows for a relative simple user setup, and eliminates wiring closet confusion. Moreover, through its use of the receiver control logic module the inverse multiplexer of the invention is able to gather rudimentary error detection monitoring, in the form of statistically extrapolated sample data, and automatically detect channel failure and reconnection, as well as adjust bandwidth to meet user demands.

While we have shown and described an embodiment of an inverse multiplexer in accordance with the present invention, it is to be understood that the same is not limited thereto but is susceptible to numerous changes and modifications as known to a person skilled in the art. We therefore do not wish to be limited to details shown and described herein, but intend to cover all such changes and modifications as are obvious to one of ordinary skill in the art.

What is claimed is:

1. A method of transporting a serial stream of high bandwidth serial communication signals from a first site to a second site, that is linked to said first site by way of a plurality of serial communication channels whose individual bandwidths are less than said high bandwidth, and recovering said high bandwidth serial communication signal at said second site for application to a destination communication path, said method comprising the steps of:

at said first site (a) demultiplexing said serial stream of high bandwidth serial communication signals into a plurality of packets of serial communication signals having reduced bandwidths capable of being transmitted over said plurality of serial communication channels;

(b) for each respective serial communication channel, generating a multibit packet reassembly control word containing first information that identifies said respective serial communication channel, and second information representative of the order in which said plurality of packets of serial communication signals have been demultiplexed in step (a);

(c) for each respective serial communication channel, combining respectively different individual bits of said multibit packet reassembly control word generated in step (b) with respectively different packets of serial communication signals demultiplexed in step (a) to produce successive frames of serial communication signals;

(d) transmitting respectively different successive frames of serial communication signals from said first site over respectively different ones of said communication channels to said second site; and at said second site (e) receiving said respectively different successive frames of serial communication signals as transmitted from said first site over said respectively different ones of said communication channels; and (f) processing said respectively different successive frames of serial communication signals as received from said first site, in accordance with information contained in said multibit packet reassembly control words contained therein, so as to recover said serial stream of high bandwidth serial communication signals for application to said destination communication path.

2. The method according to claim 1, wherein step (f) comprises (f1) for a respective communication channel, processing successive frames of serial communication signals as transmitted over said respective communication channel from said first site, so as to recover successive packets of serial communication signals contained in respective ones of said successive frames and to recover respective multibit packet reassembly control words associated with pluralities of said successive packets of serial communication signals, and storing said successive packets of serial communication signals in memory, and (f2) reading out packets of serial communication signals stored in said memory for each of said communication channels in accordance said multibit packet reassembly control words recovered in step (f1), so as to reassemble packets of serial communication signals into said serial stream of high bandwidth serial communication signals for application to said destination communication path.

3. The method according to claim 2, wherein step (f2) comprises processing said multibit packet reassembly control words recovered in step (f1), so as to produce read out address pointers to said memory, that are effective to read out therefrom packets of serial communication signals for each of said communication channels in a manner that causes read-out packets of serial communication signals to be reassembled into said serial stream of high bandwidth serial communication signals for application to said destination communication path.

4. The method according to claim 1, wherein step (f1) comprises (f1-1) processing successive frames of serial communication signals as received from said first site, so as to separate successive packets of serial communication signals from respectively different bits of multibit packet reassembly control words combined therewith, (f1-2) analyzing a respective multibit packet reassembly control word, and (f1-3) in response to step (f1-2) identifying a valid packet reassembly control word, storing said valid packet reassembly control word, and wherein step (f2) comprises processing multibit packet reassembly control words stored in step (f1-3) for each of said communication channels, so as to produce read out address pointers to said memory, that are effective to read out therefrom packets of serial communication signals for each of said communication channels, in a manner that causes readout packets of serial communication signals to be reassembled into said serial stream of high bandwidth serial communication signals for application to said destination communication path.

5. The method according to claim 4, wherein step (f1-3) comprises, in response to step (f1-2) failing to identify a valid packet reassembly control word, declaring an error and returning to step (f1-1).

6. The method according to claim 5, wherein step (f1-3) further comprises, in response to declaring a prescribed number of errors resulting from analyses of multiple successive multibit packet reassembly control words for said channel failing to identify a valid packet, interrupting use of said respective communication channel to transmit frames of said demultiplexed serial communication signals from said first site to said second site.

7. The method according to claim 6, wherein step (f1-3) further comprises, for said respective communication channel use of which has been interrupted, causing said first site to transmit thereover to said second site prescribed information associated with channel transport quality, and analyzing said prescribed information to determine whether said interrupted communication channel may be employed to transport frames of said demultiplexed serial communication signals from said first site to said second site.

8. The method according to claim 4, wherein step (f1-2) comprises analyzing a selected number of less than all of the bits of a respective multibit packet reassembly control word for the presence of a valid code word and, in response to detecting the presence of said valid code word in said selected number of less than all of the bits of said respective multibit packet reassembly control word, performing a validity check on the entirety of said respective multibit packet reassembly control word.

9. A system for transporting a serial stream of high bandwidth serial communication signals from a first site over a plurality of serial communication channels having individual bandwidths less than said high bandwidth to a second site, said system comprising:

at said first site an input demultiplexer that is operative to demultiplex said serial stream of high bandwidth serial communication signals applied thereto into a plurality of packets of serial communication signals at a plurality of output ports thereof, each packet having a reduced bandwidth capable of being transmitted over a respective one of said plurality of serial communication channels;

a plurality of transmitter units, a respective one of which is operative to transmit over a respective one of said plurality of serial communication channels, and is coupled to receive successive packets of serial communication signals as demultiplexed at a respective output port of said input demultiplexer, and is coupled to receive a multibit packet reassembly control word containing first information that identifies said respective one of said plurality of serial communication channels, and second information representative of the order in which said plurality of packets of serial communication signals have been demultiplexed at said respective output port of said input demultiplexer, said respective transmitter unit being operative to combine respectively different individual bits of said multibit packet reassembly control word with respectively different packets of serial communication signals demultiplexed at said respective output port to produce successive frames of serial communication signals for transmission over said respective one of said plurality of serial communication channels; and at said second site a plurality of receiver units, each of which is coupled to receive successive frames of serial communication signals as transmitted from an associated transmitter at said first site over one of said communication channels; and a receiver processor that is operative to process respectively different frames of serial communication signals as received by plurality of receiver units, in accordance with information contained in said multibit packet reassembly control words, in a manner that recovers said high serial stream of bandwidth serial communication signals for application to said destination communication path.

10. The system according to claim 9, wherein a respective receiver unit is operative to recover successive packets of serial communication signals contained in said successive frames, and to recover respective multibit packet reassembly control words associated with pluralities of received packets of serial communication signals, and wherein said receiver processor is operative to store in memory successive packets of serial communication signals as recovered by said receiver units, and to controllably read out from memory packets of serial communication signals for each of said communication channels in accordance with multibit packet reassembly control words recovered for each of said communication channels, and reassemble said packets of serial communication signals into said serial stream of high bandwidth serial communication signals for application to said destination communication path.

11. The system according to claim 10, wherein said receiver processor is operative to process said recovered multibit packet reassembly control words to produce read out address pointers that are effective to read out from said memory packets of serial communication signals for each of said communication channels in a manner that causes readout packets of serial communication signals to be reassembled into said serial stream of high bandwidth serial communication signals for application to said destination communication path.

12. The system according to claim 9, wherein a respective receiver unit comprises a frame disassembly unit that is operative to process successive frames of serial communication signals received from said first site, so as to separate successive packets of serial communication signals from respectively different bits of multibit packet reassembly control words combined therewith, and wherein said receiver processor is operative to analyze a respective multibit packet reassembly control word and, in response detecting a valid packet reassembly control word, to store said valid packet reassembly control word, and to process stored valid packet reassembly control words for each of said communication channels, so as to produce read out address pointers to said memory, that are effective to read out therefrom packets of serial communication signals for each of said communication channels, in a manner that causes readout packets of serial communication signals to be reassembled into said serial stream of high bandwidth serial communication signals for application to said destination communication path.

13. The system according to claim 12, wherein said receiver processor is further operative to declare an error in response to failing to detect a valid packet reassembly control word.

14. The system according to claim 13, wherein said receiver processor is further operative, in response to having declared a prescribed number of errors resulting from analyses of multiple successive multibit packet reassembly control words for said channel failing to identify a valid packet, to interrupt use of said respective communication channel to transmit frames of said demultiplexed serial communication signals from said first site to said second site.

15. The system according to claim 14, wherein said receiver processor is further operative, to cause a transmitter unit, at said first site and associated with said respective communication channel use of which has been interrupted, to transmit prescribed information associated with channel transport quality over said respective communication channel use of which has been interrupted, and to analyze said prescribed information to determine whether said interrupted communication channel may again be employed to transport frames of said demultiplexed serial communication signals from said first site to said second site.

16. The system according to claim 12, wherein said receiver processor is operative to analyze a selected number of less than all of the bits of a respective multibit packet reassembly control word for the presence of a valid code word and, in response to detecting the presence of said valid code word in said selected number of less than all of the bits of said respective multibit packet assembly control word, is operative to perform a validity check on the entirety of said respective multibit packet reassembly control word.

17. An apparatus for transporting a serial stream of high bandwidth serial communication signals from a first site over a plurality of serial communication channels having individual bandwidths less than said high bandwidth to a second site comprising:

an input demultiplexer that is operative to demultiplex said serial stream of high bandwidth serial communication signals applied thereto into a plurality of packets of serial communication signals at a plurality of output ports thereof, each packet having a reduced bandwidth capable of being transmitted over a respective one of said plurality of serial communication channels; and a plurality of transmitter units, each of which is coupled to receive successive packets of serial communication signals demultiplexed at a respective output port of said input demultiplexer, as well as a multibit packet reassembly control word containing first information that identifies said respective one of said plurality of serial communication channels, and second information representative of the order in which said plurality of packets of serial communication signals have been demultiplexed at said respective output port of said input demultiplexer, a respective transmitter unit being operative to combine respectively different individual bits of said multibit packet reassembly control word with respectively different packets of serial communication signals demultiplexed at said respective output port and to transmit successive frames of serial communication signals over a respectively different one of said plurality of serial communication channels.

18. An apparatus for recovering a serial stream of high bandwidth serial communication signals from successive frames of serial communication signals that have been received from a plurality of serial communication channels having individual bandwidths less than said high bandwidth comprising:

a plurality of receiver units, a respective one of which is coupled to receive successive pluralities of successive frames of serial communication signals from a respective one of said communication channels, a respective frame of serial communication signals containing a packet of serial communication signals, and a respectively different individual bit of a multibit packet reassembly control word containing first information that identifies said respective one of said plurality of serial communication channels, and second information representative of the order of said transmission of said successive pluralities of successive frames of serial communication signals; and a receiver processor that is operative to process respectively different frames of serial communication signals as received by plurality of receiver units, in accordance with information contained in multibit packet reassembly control words therefor, in a manner that recovers said serial stream of high bandwidth serial communication signals for application to said destination communication path.

19. The apparatus according to claim 18, wherein a respective receiver unit comprises a frame disassembly unit that is operative to process successive frames of serial communication signals received from said respective communication channel, so as to separate successive packets of serial communication signals from respectively different bits of multibit packet reassembly control words combined therewith, and wherein said receiver processor is operative to analyze a respective multibit packet reassembly control word and, in response detecting a valid packet reassembly control word, to store said valid packet reassembly control word, and to process stored valid packet reassembly control words for each of said communication channels, so as to produce read out address pointers to said memory, that are effective to read out therefrom packets of serial communication signals for each of said communication channels, in a manner that causes readout packets of serial communication signals to be reassembled into said serial stream of high bandwidth serial communication signals for application to said destination communication path.

20. The apparatus according to claim 19, wherein said receiver processor is further operative to declare an error in response to failing to detect a valid packet reassembly control word and, in response to having declared a prescribed number of errors resulting from analyses of multiple successive multibit packet reassembly control words for said channel failing to identify a valid packet, to interrupt use of said respective communication channel to transmit frames of said demultiplexed serial communication signals from said first site to said second site.

21. The apparatus according to claim 19, wherein said receiver processor is operative to analyze a selected number of less than all of the bits of a respective multibit packet reassembly control word for the presence of a valid code word and, in response to detecting the presence of said valid code word in said selected number of less than all of the bits of said respective multibit packet assembly control word, is operative to perform a validity check on the entirety of said respective multibit packet reassembly control word.

* * * * *

UNITED STATES PATENT AND TRADEMARK OFFICE
CERTIFICATE OF CORRECTION

| | | |
|---|---|---|
| PATENT NO. | : 7,212,548 B2 | Page 1 of 1 |
| APPLICATION NO. | : 10/177284 | |
| DATED | : May 1, 2007 | |
| INVENTOR(S) | : Jason David Bridges, Jason Robert Gastler and Charles A. Wilson | |

It is certified that error appears in the above-identified patent and that said Letters Patent is hereby corrected as shown below:

Column 1, Line 50    Delete: "(on the order of eleven,"

Insert: --(on the order of eleven percent),--

Column 6, Line 9    Delete: "(11=dead/test)"

Insert: --(11=dead/test).--

Column 13, Line 34    Delete: "at said second site"

Insert: --at said second site- --

Column 15, Line 1    Delete: "at said first site"

Insert: --at said first site- --

Column 15, Line 30    Delete: "at said second site"

Insert: --at said second site- --

Column 18, Line 18    Delete: "a manner that causes readout packets"

Insert: --a manner that causes read-out packets--

Signed and Sealed this

Third Day of July, 2007

JON W. DUDAS
*Director of the United States Patent and Trademark Office*